US006931018B1

(12) United States Patent
Fisher

(10) Patent No.: US 6,931,018 B1
(45) Date of Patent: Aug. 16, 2005

(54) LOCAL NETWORK ROUTER AND METHOD OF ROUTING IP DATA PACKETS

(75) Inventor: Gregory S. Fisher, Thornton, CO (US)

(73) Assignee: AT&T Corp., New York, NY (US)

( * ) Notice: Subject to any disclaimer, the term of this patent is extended or adjusted under 35 U.S.C. 154(b) by 809 days.

(21) Appl. No.: 09/810,780

(22) Filed: Mar. 16, 2001

(51) Int. Cl.$^7$ ............................................ H04L 12/28
(52) U.S. Cl. ...................................... 370/401; 370/475
(58) Field of Search ............................... 370/401, 389, 370/245, 392, 400, 475, 485, 486, 487

(56) References Cited

U.S. PATENT DOCUMENTS

| 5,802,316 | A | * | 9/1998 | Ito et al. ........................ 709/249 |
| 5,987,524 | A | * | 11/1999 | Yoshida et al. ............... 709/245 |
| 6,047,325 | A | * | 4/2000 | Jain et al. ..................... 709/227 |
| 6,115,545 | A | * | 9/2000 | Mellquist ...................... 709/220 |
| 6,151,635 | A | | 11/2000 | Bare et al. |
| 6,167,444 | A | | 12/2000 | Boden et al. |
| 6,178,455 | B1 | | 1/2001 | Schutte et al. |
| 6,195,425 | B1 | | 2/2001 | Farris et al. |
| 6,574,664 | B1 | * | 6/2003 | Liu et al. ..................... 709/224 |
| 6,665,305 | B1 | * | 12/2003 | Weismann .................... 370/401 |
| 6,763,023 | B1 | * | 7/2004 | Gleeson et al. .............. 370/392 |

* cited by examiner

*Primary Examiner*—Ajit Patel
*Assistant Examiner*—Andrew C. Lee
(74) *Attorney, Agent, or Firm*—Brooks Kushman P.C.

(57) ABSTRACT

A local network router learns to route IP traffic among customer premises equipment on a local network rather than permitting the IP traffic to be routed through a broadband cable network and selected internet service provider (ISP) to the internet. The local network router dynamically generates a routing table from address resolution protocol (ARP) packets exchanged between the CPE and the external network. For each IP data packet received from a CPE that is destined for another local CPE, the local network router replaces a default gateway with the destination CPE. Accordingly, network resources for routing traffic are significantly reduced.

22 Claims, 4 Drawing Sheets

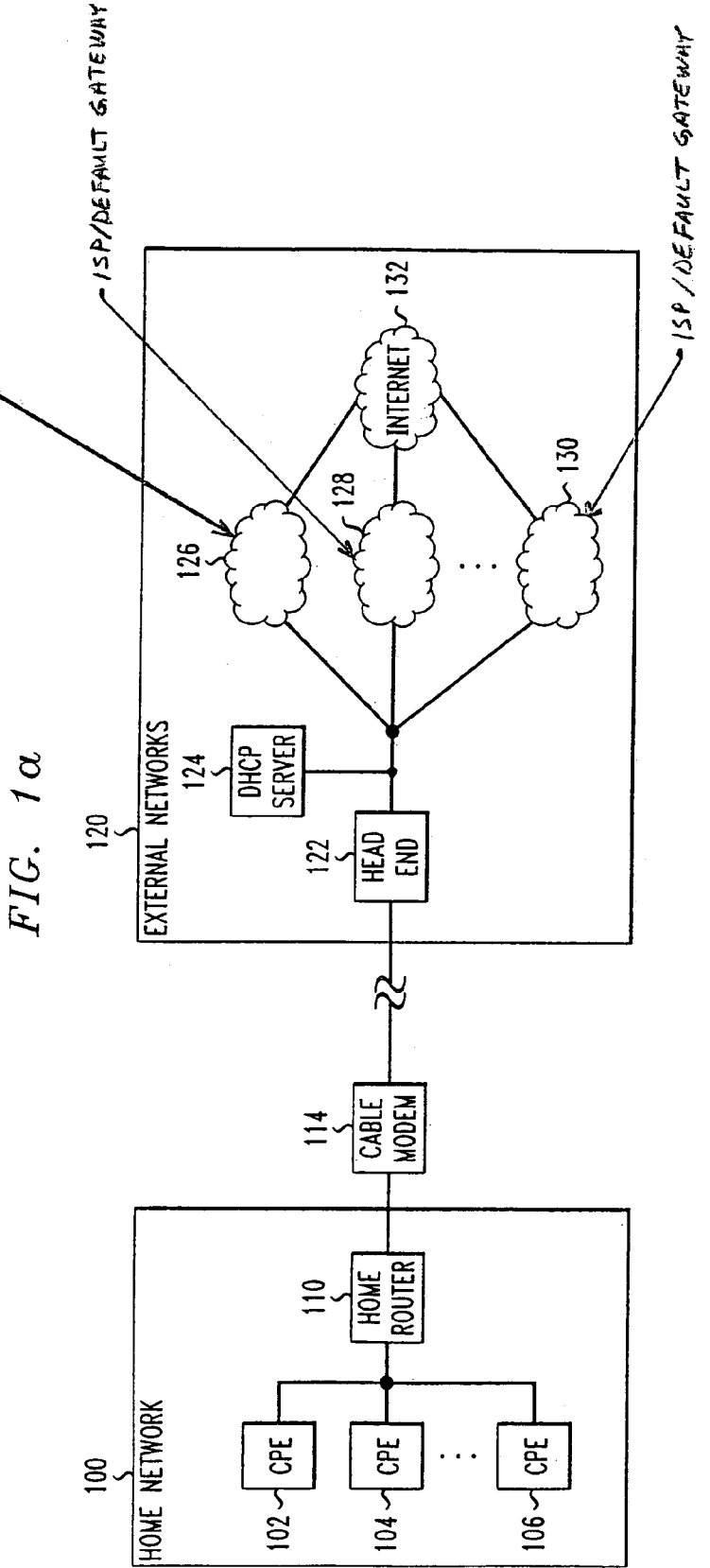

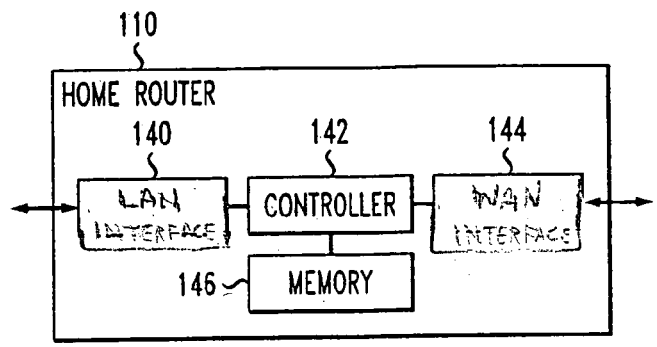

FIG. 4

```
ROUTER TABLE CREATION  — 400
        ↓
CPE RECEIVES IP ADDRESS  — 402
        ↓
CPE GENERATES ARP PACKET AND SENDS TO DEFAULT GW  — 404
        ↓
HOME ROUTER PULLS SENDER MAC ADDRESS AND SENDER IP
ADDRESS FROM ARP PACKET (208, 210)  — 406
        ↓
STORE SENDER IP ADDRESS AND MAC ADDRESS IN TABLE  — 408
        ↓
VERIFY IP ADDRESSES IN TABLE  — 410
        ↓
CONTINUOUSLY MONITOR ARP PACKETS  — 412
```

FIG. 5
500

| 506 | MAC ADDRESS 502 | IP ADDRESS 504 |
|---|---|---|
| CPE # 1 | D0:00:C0:93:19:00 | 24.98.214.56 |
| CPE # 2 | 44:45:53:54:00:00 | 56.78.32.178 |
| CPE # 3 | 00:10:54:62:8F:16 | 234.44.44.98 |
| ⋮ | | |
| CPE # N | | |

LOCAL NETWORK ROUTER AND METHOD OF ROUTING IP DATA PACKETS

FIELD OF THE INVENTION

This invention relates in general to routing methods, in particular to IP routing and more particularly to routing data packets in a home or office and through systems that provide two-way data communications over cable television networks.

BACKGROUND OF THE INVENTION

Cable television networks provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+Mbps or greater. The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+Mbps or greater available on a coaxial cable or HFC cable system on a cable television network.

With the explosive growth of the Internet, many customers have desired to use the larger bandwidth of a cable television network to connect to the Internet and other computer networks. Cable modems offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+Mbps or greater, which is a much larger data rate than can be supported by a modem used over a serial telephone line.

Many cable television networks now provide two-way or bi-directional cable systems, supporting both a downstream and upstream data path. A downstream data path is the flow of data from a cable system headend to a customer. A cable system headend is a central location in the cable television network that is responsible for sending cable signals in the downstream direction. A return data path via an out-of-band channel is typically used for an upstream data path. An upstream data path is the flow of data from the customer back to the cable system headend.

An exemplary data-over-cable system includes customer premise equipment (CPE) (e.g., a customer computer), a cable modem, a cable modem termination system, a cable television network, and a data network (e.g., the Internet).

The cable modem termination system receives data packets from the data network and transmits them downstream via the cable television network to a cable modem attached to the CPE. In a two-way cable system, the CPE sends response data packets to the cable modem, which sends the data packets upstream via the cable television network to the cable modem termination system. The cable modem termination system sends the response data packets back to the appropriate host on the data network.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached CPE with the cable modem termination system.

A cable modem termination system in a data-over-cable system typically manages connections to tens of thousands of cable modems. Most of the cable modems are attached to host CPE such as a customer computer. To send and receive data to and from a computer network like the Internet or an intranet, a cable modem and CPE and other network devices have a network address dynamically assigned on the data-over-cable system. Many data-over-cable systems in the prior art use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

As a cable modem is initialized, it will obtain a network address such as an Internet Protocol address (e.g., with a Dynamic Host Configuration Protocol) and send the network address to the cable modem termination system. The cable modem termination system stores the network address for the cable modem in an internal table. When CPE attached to a cable modem is initialized, it will also obtain a network address such as an Internet Protocol address. The network address for the CPE is stored in an internal table on the cable modem. The network address for the CPE is also stored on the cable modem termination system with a network address for a cable modem the CPE is associated with. When data arrives for the CPE from a network like the Internet or an intranet, the cable modem termination system uses the internal tables to route the data to the CPE. A network address from the data will be used to compare with network addresses from the internal tables on the cable modem termination system. The cable modem termination system will look up a network address from the data and determine that it is for CPE. Since the cable modem termination does not have direct connections to CPE, it will send the data to a cable modem associated with the CPE. The network address for the cable modem is determined from an internal table on the cable modem termination system that associates a cable modem with a CPE.

In many cases, there are several pieces of CPE at, for example, a home location that may communicate through a single cable modem through a broadband two-way cable network. Each CPE may communicate with a different ISP to reach the internet and communication with other network equipment, including the other CPE at the location. For example, in a home with several computers and several different users, each user may use a different ISP for internet communications, and may even switch between the various ISP's that are coupled to the cable system. When any one of the CPE desire to communicate with another CPE at the home location, traffic is routed through the cable modem, through the cable network and to the ISP selected by the CPE, and routed onto the internet. From the internet, the traffic is routed to the ISP chosen by the destination CPE which routes the traffic back to the cable network and then back to the home network. As can be seen, there are significant external network resources required to route traffic between CPE that are located nearby each other or within a local network.

Thus, what is needed is a practical, economical, and more efficient apparatus and method for routing traffic between CPE. What is also needed is an improved apparatus and method for routing traffic between CPE that reduces external network requirements. What is also needed is apparatus and method that more efficiently routes traffic between local CPE while properly routing traffic destined for the internet through an ISP associated with the CPE.

SUMMARY OF THE INVENTION

The present invention provides, a local network router that learns to route IP traffic among customer premises equipment on a local network rather than permitting the IP traffic to be routed through a broadband cable network and selected internet service provider (ISP) to the internet. The local network router dynamically generates a routing table from address resolution protocol (ARP) packets exchanged between the CPE and the external network. The table includes, for example, MAC addresses and IP addresses for each CPE on the local network. For each IP data packet received from a CPE that is destined for another local CPE, the local network router replaces a default gateway address with an IP address corresponding with the destination CPE. Accordingly, network resources for routing traffic are significantly reduced.

In accordance with the preferred embodiment, a method of routing IP data packets is provided for an internal network comprising a plurality of customer premises equipment (CPE) each having an associated IP address and machine address. The method comprises the steps of comparing, for IP data packets received from the internal network, a destination IP address of a received IP data packet with IP addresses stored in a routing table, and when said destination IP address matches one of said IP addresses stored in said routing table, replacing a default gateway address of said IP data packet with a machine address corresponding with said one IP address from said routing table to create a revised data packet. The revised data packet is routed to said internal network for receipt another of said CPE, said another CPE having said machine address corresponding with said one IP address.

In one preferred embodiment, the method further comprises the steps of monitoring IP data packets sent from the plurality of CPE direct to an external communication network to detect address resolution protocol (ARP) packets sent from each of said CPE, extracting said machine address and said IP address associated with said each CPE from the ARP packet, and storing said machine address and said IP address in said routing table that correlates machine addresses and IP addresses with each CPE of said plurality.

Additionally, the method further may comprise the steps of routing the IP data packets received from the CPEs to an external network when said destination IP address does not match one of said IP addresses stored in said routing table, and routing IP data packets received from the external network directly to the internal network.

In another embodiment, the present invention provides a router for use in an internal network. The internal network comprises a plurality of customer premises devices coupled to the router and a cable modem coupling the router with an external network. The router comprises a controller for monitoring IP data packets sent from the plurality of CPE direct to the external communication network to detect address resolution protocol (ARP) packets sent from each of said CPE and extracting a machine address and an IP address from the ARP packet, and a memory for storing said machine address and said IP address in a routing table that correlates machine addresses and IP addresses with each CPE of said plurality. The controller, for each IP data packet received from each CPE, compares a destination IP address of said IP data packet with the IP addresses stored in said routing table, and when said destination IP address matches one of said IP addresses stored in said routing table, replaces a default gateway address of said IP data packet with said machine address corresponding with said one IP address from said routing table to create a revised data packet, and places said revised data packet onto an internal network for receipt by one of said CPE, said one CPE having said machine address corresponding with said one IP address.

In one preferred embodiment, the router additionally comprises first and second interfaces coupled with the controller. The first and second interfaces provide Ethernet connectivity with networks external to said router. The first interface is coupled to said internal network, and the second interface is coupled to said cable modem for communicating with the external network. For example, the first router interface is a local area network (LAN) interface, and the second router interface is a wide-area network (WAN) interface.

BRIEF DESCRIPTION OF THE DRAWINGS

The present invention is pointed out with particularity in the appended claims. However, a more complete understanding of the present invention may be derived by referring to the detailed description and claims when considered in connection with the figures, wherein like reference numbers refer to similar items throughout the figures, and:

FIG. 1a is a simplified block diagram of a communication network in accordance with a preferred embodiment of the present invention;

FIG. 1b is a simplified functional block diagram of a router in accordance with a preferred embodiment of the present invention;

FIG. 2 is a simplified block diagram of an address resolution protocol (ARP) data packet suitable for use with a preferred embodiment of the present invention;

FIG. 3 is a simplified block diagram of an IP data packet suitable for use with a preferred embodiment of the present invention;

FIG. 4 is a simplified flow chart of a procedure for generating a routing table in accordance with a preferred embodiment of the present invention;

FIG. 5 illustrates a routing table suitable for use with a preferred embodiment of the present invention.

Figure 6:
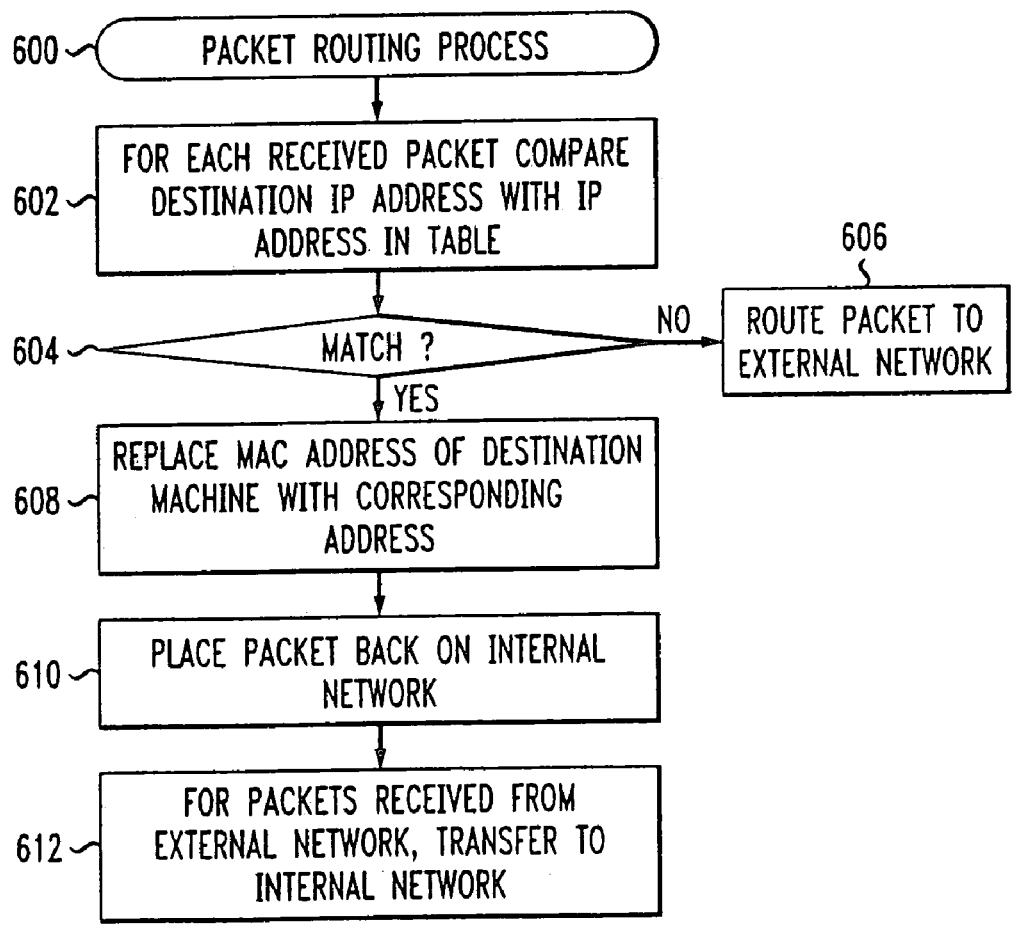
FIG. 6 is a simplified flow chart of a procedure for routing IP data packets in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a router and method of routing suitable for use in local networks and in-home use. In accordance with the preferred embodiments, the method and router of the present invention, a plurality of customer premises equipment (CPE)

communicate through a two-way broadband communication network to an internet service provider (ISP) to access the internet. Traffic destined for CPE is contained within the local network of CPEs. A routing table is dynamically generated by the router using address resolution protocol (ARP) packets. The routing table preferably includes the IP addresses and machine address of all CPE on the local network. Traffic from any of the CPE on the local network that is destined for other CPE on the local network is routed back to the local network. In this way, traffic between CPE's does not need to routed through the cable network to the ISP's. On the other hand, traffic from any of the CPE that is destined for an external network is routed to the external network.

FIG. 1a is a simplified block diagram of a communication network in accordance with a preferred embodiment of the present invention. Network 100 may be an in-home network or a local area network (LAN) and comprises a plurality of customer premises equipment (CPE) 102, 104, 106 coupled to home router 110. CPE include any computer type equipment that are assigned IP addressed from an internet service provider (ISP) 126, 128 or 130. CPE include personal computers, web tablets and any internet communication devices. Home router is coupled to a modem which communicates through an external network 120 to the ISP's. External network includes cable system head end 122 and various other cable network communication infrastructure required to provide its services. In accordance with the preferred embodiment of the present invention, modem 114 is a cable modem and external network is a broadband two-way cable television system that provides two-way data communications in addition to video broadcast services. Network elements such as CPE, home router 110 and modem 114 communicate preferably using standard Ethernet communication interfaces and data formats.

Each CPE receives an IP addresses from the external systems DHCP server and communicates over internet 132 through an particular internet service provider (ISP) selected by the CPE or assigned by the DHCP server. It should be noted that IP addresses assigned to any of the CPE are not static and change at least whenever a new session with an ISP is started.

FIG. 1b is a simplified functional block diagram of a router in accordance with a preferred embodiment of the present invention. Router 110 comprises interface 140 for communicating with in-home CPE over an in-home network, and interface 144 for communicating with an external network, preferably through cable modem 114 (FIG. 1a). Controller 142 couples interfaces 140 and 144 routing traffic that comprises IP data packets in accordance with information stored in memory 146. Memory 146 comprises any data storage element for storing routing instructions such as a routing table.

FIG. 2 is a simplified block diagram of an address resolution protocol (ARP) data packet suitable for use with a preferred embodiment of the present invention. ARP data packet 200 comprises Ethernet destination address field 202, Ethernet source address field 204, other data fields 206, sender MAC address field 208, sender IP address field 210, Ethernet target address field 214 and target IP address field 216. A MAC address as used herein is the Media Access Control address and refers to the physical or hardware address of a hardware element. The MAC address also may be the Ethernet address. An ARP packet is sent by CPE to a default gateway after a CPE receives it's IP address from the DHCP process. One purpose of CPE sending the ARP packet is to receive configuration information from the default gateway. The default gateway is associated with the CPE's ISP and is designated by target IP address 216 in ARP packet 200.

Ethernet destination address field 202, for example, is set to all ones to signify a broadcast address. All Ethernet interfaces on the network preferably receive the frame. Ethernet source address field 204 and a 2-bit frame type included in other data field 206 comprise the rest of the Ethernet header for the packet. The other eight bits of other data field 206 are comprised hardware type fields and an ARP operations field. Sender hardware address field 208 is the Ethernet address of the device sending the packet. This is preferably the same as the information contained in Ethernet source address field 204. Sender IP address field 210 is the IP address that has been assigned to the device sending the packet. Target Ethernet address field 214 is preferably left blank and is filled in by the system that receives the ARP request. Target IP address field 216 is the IP address that the sending machine is trying to resolve to a matching Ethernet address.

FIG. 3 is a simplified block diagram of an IP data packet suitable for use with a preferred embodiment of the present invention. IP data packet 300 comprises source MAC address field 302, default gateway MAC address field 304, source IP address field 306, destination IP field 308 and IP data field 310.

Source MAC address field 302 is the hardware address of the device sending the packet. Default Gateway MAC field 304 is the Ethernet address of the router residing in a service provider network that acts as the first hop point for the packet. Source IP address field 306 is the IP address assigned to the machine sending the packet. Destination IP address field 308 is the address of the final destination of the data enclosed in the packet from the sending machine.

FIG. 4 is a simplified flow chart of a procedure for generating a routing table in accordance with a preferred embodiment of the present invention. In step 402, the CPE receive an IP address as part of the DHCP process described above. This IP address is stored in each CPE, and may change each time the CPE is turned on, or the user selects a new ISP. In step 404, the CPE generates an ARP packet as described above and sends the generated ARP packet to a default gateway associated with the ISP selected for the CPE. In step 406, the router, which monitors traffic passing through, identifies the ARP packet and pulls the sender's MAC address and sender's IP address from the ARP packet. Using an ARP packet to identify the sender's MAC address and sender's IP address helps assure the router that it has the current and proper IP address for each CPE.

In step 408, the sender's MAC address and sender's IP address are stored in a routing table of the router for each CPE. In step 410, the IP addresses are verified in the routing table, preferably on a regular basis such as every 5 minutes. The periodic verification of the IP addresses could occur on any suitable basis with 5 minutes, being one example. In this way, the disconnection of an IP device is detected at the next verification, the length of period being a design choice as understood by one of ordinary skill in the art. Step 410 may be performed by sending a "ping" to each CPE to verify that the CPE are still operating, or by sending an ARP type packet requesting the CPE to verify it's address.

In step 412, ARP packets from the plurality of CPE are continually monitored to detect any newly added CPE or changes in CPE IP addresses. Preferably, steps 406 through 410 are repeated for each detected ARP packet. Accordingly, through the execution of procedure 400, the router maintains the proper IP addresses of CPE operating in the in-home network.

FIG. 5 illustrates an example routing table suitable for use with a preferred embodiment of the present invention. Table 500 comprises MAC addresses 502 and corresponding IP addresses 504 for each CPE 506 of home-network.

FIG. 6 is a simplified flow chart of a procedure for routing IP data packets in accordance with a preferred embodiment of the present invention. Packet routing process 600 is performed for all traffic that is received by the router. In step 602, IP data packets that are received from CPE on the in-home network are evaluated. The destination IP address in the IP data packet is compared with the IP addresses of the routing table. In step 604, when the destination IP address in the IP data packet does not match an IP addresses stored in the routing table, step 606 is performed. In step 606, the IP data packet is routed to the external network. This situation applies to traffic from the CPE that is not destined for another CPE located in the home or on the local network. In reference to FIG. 1, in step 606, IP data packets received from CPE at router interface 140 (FIG. 2) are transferred directly to router interface 144 (FIG. 2) for receipt by modem 114 (FIG. 1).

In step 604, when the destination IP address in the IP data packet matches an IP addresses stored in the routing table, step 608 is performed. In step 608, the router replaces the default gateway MAC address (filed 304 FIG. 3) in the IP data packet with the Ethernet address from the table that corresponds to the destination IP address in the IP data packet evaluated in step 602. As a result of step 608, a revised data packet is created. In step 610, the revised data packet is placed back on the in-home network or local network for receipt by the appropriate CPE.

In task 612, IP data packets received from an external network are directly transferred to the internal network. In reference to FIG. 1, IP data packets received from modem 114 at router interface 144 (FIG. 2) are transferred directly to router interface 140 (FIG. 2).

Thus, a router and method of routing suitable for use in local networks and in-home use has been described. The method and router of the present invention permit a plurality of customer premises equipment (CPE) to communicate through a two-way broadband communication network to an internet service provider (ISP) to access the internet, while traffic destined for local CPE is contained within the local network of CPEs.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In an internal network comprising a plurality of customer premises equipment (CPE) each having an associated IP address and machine address, a method of routing IP data packets comprising the steps of:

for IP data packets received from the internal network, comparing a destination IP address of a received IP data packet with IP addresses stored in a routing table;

when said destination IP address matches one of said IP addresses stored in said routing table, replacing a default gateway address of said IP data packet with a machine address corresponding with said one IP address from said routing table to create a revised data packet; and routing said revised data packet to said internal network for receipt by another of said CPE, said another CPE having said machine address corresponding with said one IP address;

wherein in the case where said IP data packet is not revised, routing said IP data packet receipt by a default gateway having the gateway machine address specified in said IP data packet.

2. The method as claimed in claim 1 further comprising the steps of:

monitoring IP data packets sent from the plurality of CPE direct to an external communication network to detect address resolution protocol (ARP) packets sent from each of said CPE;

extracting said machine address and said IP address associated with said each CPE from the ARP packet; and storing said machine address and said IP address in said routing table that correlates machine addresses and IP addresses with each CPE of said plurality.

3. The method as claimed in claim 1 further comprising the step of routing the IP data packets received from the CPEs to an external network when said destination IP address does not match one of said IP addresses stored in said routing table.

4. The method as claimed in claim 3 further comprising the step of routing IP data packets received from the external network directly to the internal network.

5. The method as claimed in claim 1 further comprising the step of regularly sending a request data packet to each CPE requesting a response data packet to verify the IP addresses associated with each CPE stored in the routing table.

6. The method as claimed in claim 2 wherein the monitoring step is performed substantially continually, the extracting step is performed in response to the monitoring step detecting of said ARP packet, and the storing step is performed when an IP address stored in the routing table differs from an IP address extracted from the ARP packet for a corresponding CPE.

7. The method as claimed in claim 2 further comprising the step of updating said routing table by performing the monitoring step substantially continuously, performing the extracting step when the monitoring step detects said ARP packet, and performing the storing step when an IP address stored in the routing table differs from an IP address extracted from the ARP packet for a corresponding CPE.

8. A router for use in an internal network, the internal network comprising a plurality of customer premises devices coupled to the router and a cable modem coupling the router with an external network, the router comprising:

a controller for monitoring IP data packets sent from the plurality of CPE direct to the external communication network to detect address resolution protocol (ARP) packets sent from each of said CPE and extracting a machine address and an IP address from the ARP packet; and a memory for storing said machine address and said IP address in a routing table that correlates machine addresses and IP addresses with each CPE of said plurality;

wherein the controller, for each IP data packet received from each CPE, compares a destination IP address of said IP data packet with the IP addresses stored in said routing table, and when said destination IP address matches one of said IP addresses stored in said routing table, replaces a default gateway address of said IP data packet with said machine address corresponding with said one IP address from said routing table to create a revised data packet, and places said revised data packet onto an internal network for receipt by one of said CPE, said one CPE having said machine address corresponding with said one IP address;

wherein in the case where said IP data packet is not revised, said IP data packet is routed for receipt by a default gateway having the gateway machine address specified in said IP data packet.

9. The router as claimed in claim 8 further comprising first and second interfaces coupled with the controller, the first and second interfaces providing Ethernet connectivity with networks external to said router, wherein the first interface is coupled to said internal network, and the second interface is coupled to said cable modem for communicating with the external network.

10. The router as claimed in claim 9 wherein the controller routes the IP data packets received at the first interface from the CPEs to the external network when said destination IP address does not match one of said IP addresses stored in said routing table.

11. The router as claimed in claim 9 wherein the controller routes IP data packets received at the second interface from the external network directly to the first interface for receipt by the internal network.

12. The router as claimed in claim 9 wherein the controller regularly sends a request data packet to each CPE requesting a response data packet and verified the IP addresses associated with each CPE stored in the routing table.

13. The router as claimed in claim 9 wherein the controller updates said routing table when an IP address stored in the routing table differs from an IP address extracted from the ARP packet for a corresponding CPE.

14. A method of routing IP data packets among a plurality of customer premises equipment (CPE), the method comprising the steps of:

monitoring IP data packets sent from the plurality of CPE direct to an external communication network to detect address resolution protocol (ARP) packets sent from each of said CPE;

extracting a machine address and an IP address from the ARP packet;

storing said machine address and said IP address in a routing table that correlates machine addresses and IP addresses with each CPE of said plurality;

for each IP data packet received from each CPE, comparing a destination IP address of said IP data packet with the IP addresses stored in said routing table;

when said destination IP address matches one of said IP addresses stored in said routing table, replacing a default gateway address of said IP data packet with said machine address corresponding with said one IP address from said routing table to create a revised data packet; and placing said revised data packet, onto an internal network for receipt by one of said CPE, said one CPE having said machine address corresponding with said one IP address;

wherein in the case where said IP data packet is not revised, routing said IP data packet receipt by a default gateway having the gateway machine address specified in said IP data packet.

15. The method as claimed in claim 14 further comprising the step of routing the IP data packets received from the CPEs to the external network when said destination IP address does not match one of said IP addresses stored in said routing table.

16. The method as claimed in claim 14 further comprising the step of routing IP data packets received from the external network to the internal network.

17. The method as claimed in claim 14 further comprising the step of providing each CPE an IP address from an external network server performing a dynamic host configuration protocol (DHCP).

18. The method as claimed in claim 15 further comprising the step of regularly sending a request data packet to each CPE requesting a response data packet to verify the IP addresses associated with each CPE stored in the routing table.

19. The method as claimed in claim 18 wherein the request data packet is a "ping" generated by a home router.

20. The method as claimed in claim 18 wherein the request data packet is a second ARP data packet generated by a home router.

21. The method as claimed in claim 14 wherein the monitoring step is performed substantially continually, the extracting step is performed in response to the monitoring step detecting of said ARP packet, and the storing step is performed when an IP address stored in the routing table differs from an IP address extracted from the ARP packet for a corresponding CPE.

22. The method as claimed in claim 14 further comprising the step of updating said routing table by performing the monitoring step substantially continuously, performing the extracting step when the monitoring step detects said ARP packet, and performing the storing step when an IP address stored in the routing table differs from an IP address extracted from the ARP packet for a corresponding CPE.

* * * * *

UNITED STATES PATENT AND TRADEMARK OFFICE
CERTIFICATE OF CORRECTION

PATENT NO. : 6,931,018 B1  Page 1 of 1
DATED : August 16, 2005
INVENTOR(S) : Gregory S. Fisher It is certified that error appears in the above-identified patent and that said Letters Patent is hereby corrected as shown below:

<u>Title page,</u>
Item [73], Assignee, delete "AT&T Corp., New York, NY" and replace with
-- AT&T Broadband, LLC, Englewood, CO --.

Signed and Sealed this

Fifteenth Day of November, 2005

JON W. DUDAS
*Director of the United States Patent and Trademark Office*